Aug. 17, 1926.

W. HAVER

PECAN CRACKING MACHINE

Filed August 7, 1925   7 Sheets-Sheet 2

1,596,656

Inventor
William Haver,

Attorney

Aug. 17, 1926.
W. HAVER
1,596,656
PECAN CRACKING MACHINE
Filed August 7, 1925 7 Sheets-Sheet 4
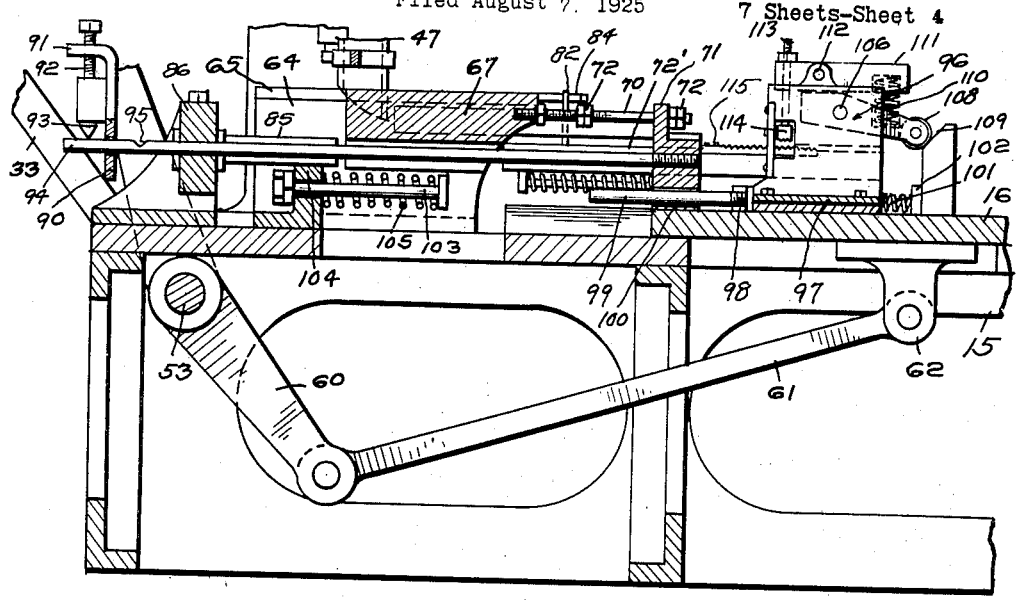
Fig. 4.
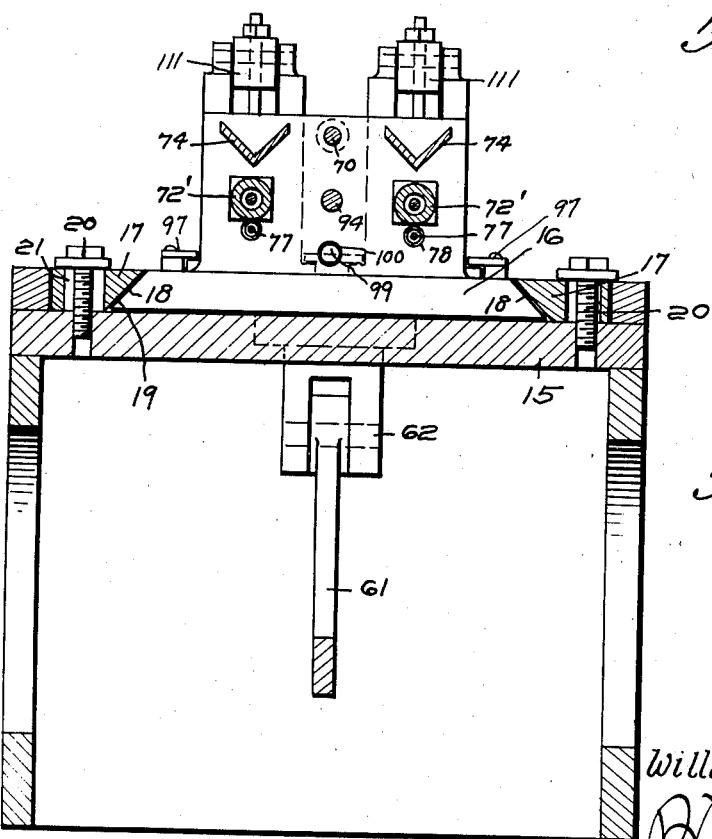
Fig. 5.
Inventor
William Haver,
Attorney Aug. 17, 1926.
W. HAVER
1,596,656
PECAN CRACKING MACHINE
Filed August 7, 1925
7 Sheets-Sheet 5
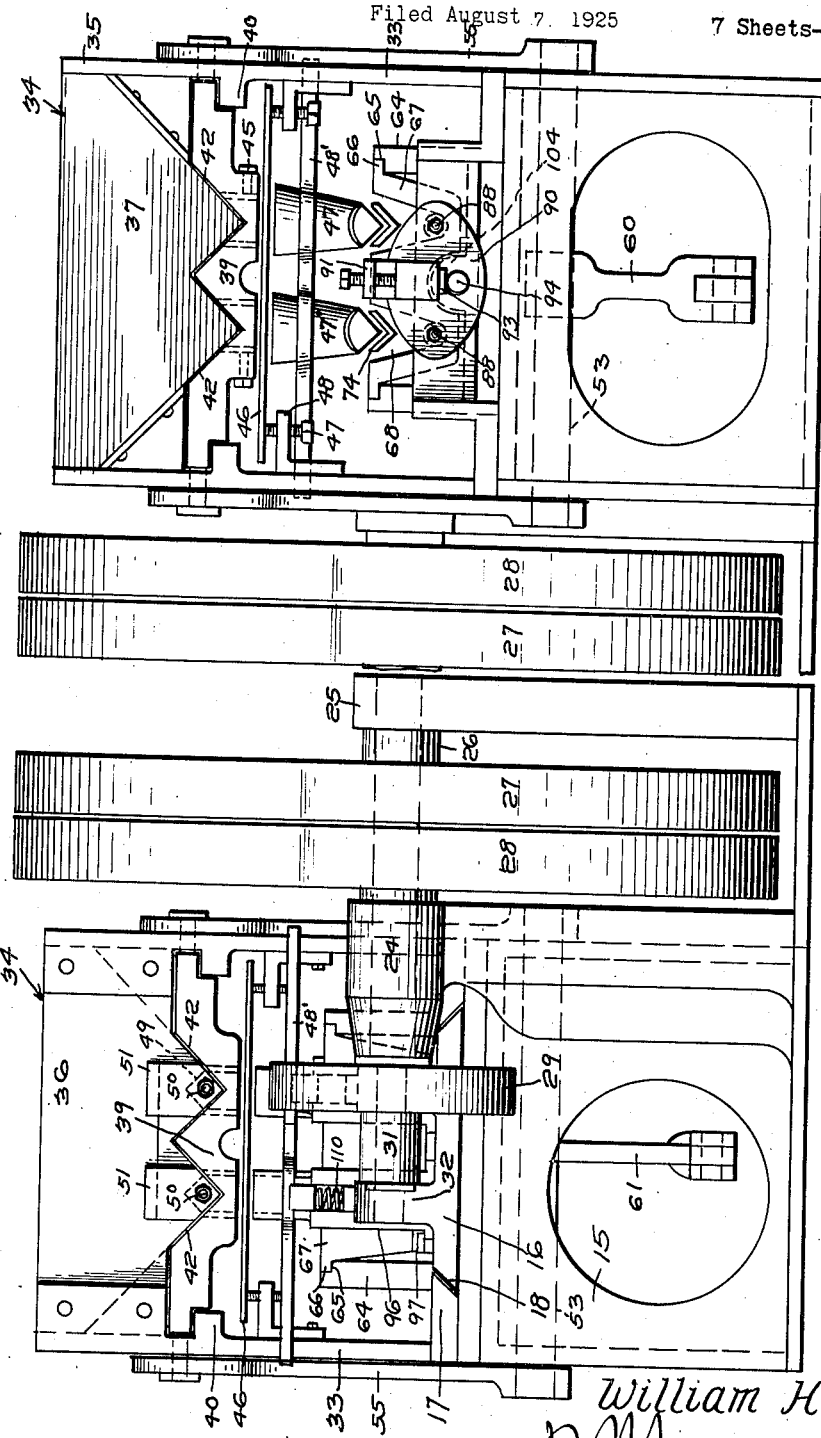
Fig. 7.
Fig. 6.
Inventor
William Haver,
By 
Attorney Aug. 17, 1926.

W. HAVER 1,596,656

PECAN CRACKING MACHINE

Filed August 7, 1925   7 Sheets-Sheet 6

Inventor

William Haver,

By

Attorney

Aug. 17, 1926.

W. HAVER 1,596,656

PECAN CRACKING MACHINE

Filed August 7, 1925    7 Sheets-Sheet 7

Inventor
William Haver,
By [signature]
Attorney

Patented Aug. 17, 1926.

1,596,656

UNITED STATES PATENT OFFICE.

WILLIAM HAVER, OF DENISON, TEXAS.

PECAN-CRACKING MACHINE.

Application filed August 7, 1925. Serial No. 48,825.

My invention relates to a machine for cracking pecans, or other nuts.

An important object of the invention is to provide means whereby the cracking force applied to the pecans, will be substantially uniform regardless of the size or length of the pecans, whereby a substantially uniform cracking is obtainable.

A further object of the invention is to provide a machine of the above mentioned character which is automatic and reliable in operation.

Other objects and advantages of the invention will be apparent during the course of the following description.

In the accompanying drawings forming a part of this specification and in which like numerals are employed to designate like parts throughout the same:—

Figure 4 is a longitudinal section taken on line 4—4 of Figure 2,

Figure 5 is a transverse section taken on line 5—5 of Figure 3,

Figure 6 is a rear end elevation of the machine,

Figure 7 is a front end elevation of the same,

Figure 10:
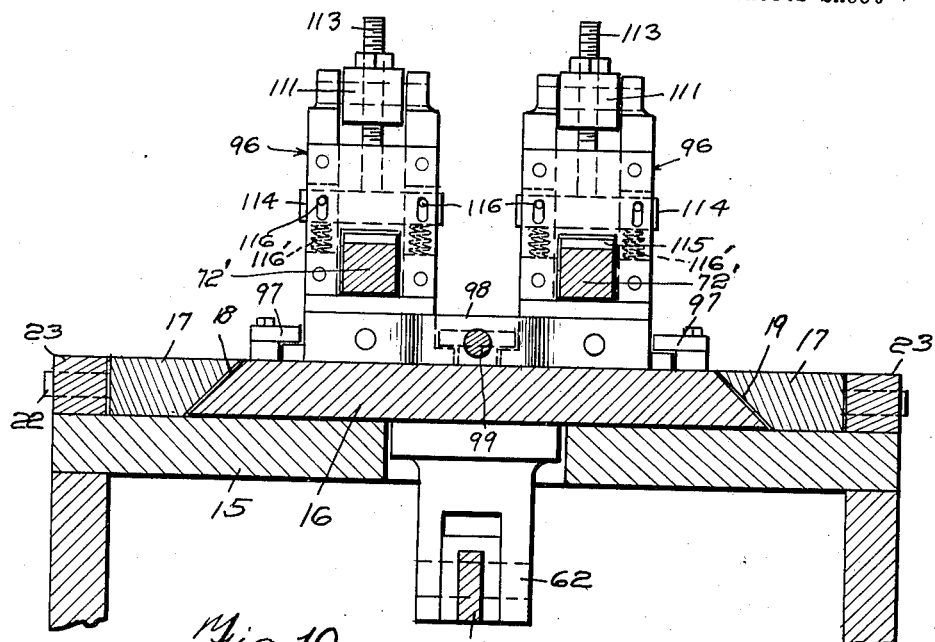
Figure 10 is a detailed transverse section taken on line 10—10 of Figure 1, and, Figure 11 is a side elevation, parts in section, of one of the cracking elements.
Figure 11:
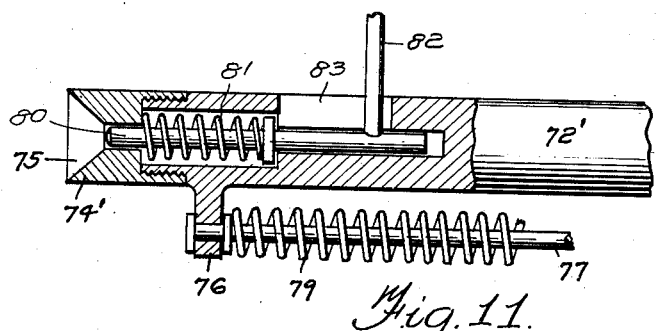

The machine embodies a main supporting table or base 15, upon which a main reciprocatory carriage or cross head 16 is mounted, at the rear end of the table or base, and operating within the longitudinal guides 17. This carriage has beveled edges 18, engaging beneath beveled edges 19, of the guides 17. These guides, see more particularly Figures 5 and 10, are held against vertical displacement by means of bolts 20, engaging the top of the table, and operating within elongated transverse slots 21. The guides 17 may be adjusted laterally by set screws or bolts 22, engaging the outer edges thereof, and bars or flanges 23, rigidly attached to the table top. It is obvious that the guides may be clamped in the adjusted position by manipulation of the nuts carried by the bolts 20. This adjustable feature is to cause the main carriage or cross head to travel in a straight path, and also to compensate for wear. Arranged at the rear end of the table or base 15 are stationary bearings 24 and 25, receiving a rotatable shaft 26, carrying loose and fast pulleys 27 and 28, as shown. The inner end of the shaft 28 is provided with a crank-disk 29, rigid theron, which is pivotally connected at 30, with a pitman 31. The forward end of this pitman is arranged between and pivotally connected with knuckles 32, rigidly secured to the main carriage or cross head 16. It is thus apparent that the rotation of the shaft 26 will cause the carriage 16 to reciprocate, in a direction longitudinally of the base or table.

Figure 9:
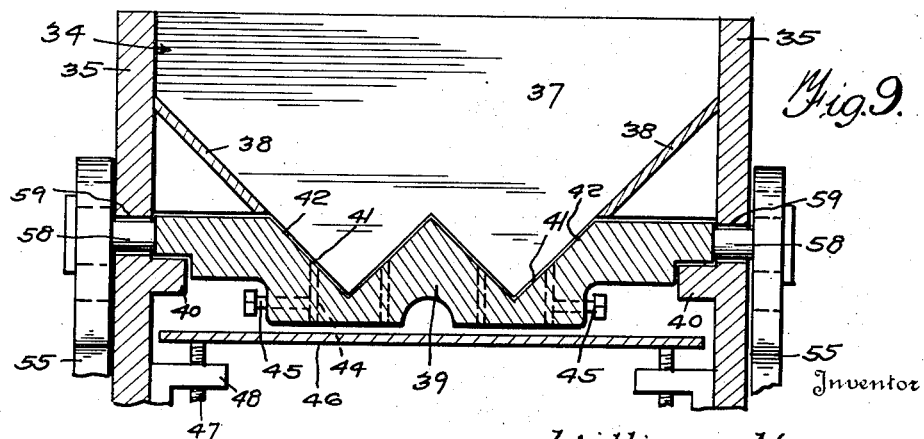
Figure 9 is a similar view taken on line 9—9 of Figure 3.

Rigidly mounted upon the forward end of the base or table 15 is a stationary hopper supporting frame 33, carrying a stationary hopper 34. This hopper embodies vertical side walls 35, and a vertical rear wall 36. The forward end of the hopper is closed by an inclined wall 37, and the lower portion of the hopper is provided with inclined walls 38. The numeral 39 designates a reciprocatory valve-bottom, which constitutes the bottom of the hopper, and is slidable longitudinally between the vertical side walls 35, and rides upon longitudinal ribs or flanges 40, as more clearly shown in Figure 9. This valve-bottom is provided with a pair of V-shaped grooves or pockets 41, extending longitudinally of the same, the outer walls 42 of these pockets, forming continuations of the inclined side walls 38. It is thus seen that the pecans held within the hopper 34 will gravitate into these pockets 41. The valve-bottom is provided with discharge openings 43, preferably arranged at an angle of 45° to the perpendicular, passing through the pockets 41, and adapted for the reception of bushings 44, which may be held in place by set bolts 45. The bore of the bushing may vary, in accordance with the diameter or size of the pecans and different bushings may be used, as desired.

Disposed near and adjacent to the valve-bottom 39 is a support plate 46, which is horizontally arranged, and is vertically adjustably supported. The adjustment of the support may be effected by vertical bolts 47, having swiveled connections with the plate 46, near its corners, and operating within stationary lugs 48. It is thus seen that when a selected pecan drops into the bushing 44, its lower end will be supported by the plate 46, and the pecan cannot fall from the bushing, until the valve-bottom 39 has moved rearwardly sufficiently, so that the bushing 44 will be positioned in advance of the support plate 46. At this time, the pecans will fall into stationary vertical guide tubes 47', carried by a stationary transverse bar or support 48'.

In the event that more than one pecan should tend to enter or pass through the bushing 44, I provide means to prevent such action. Such means comprises a pair of rectangular plungers 49, slidable within the pockets or recesses 41, and confined at the rear end of the hopper. These plungers have connection with rods 50, slidable within stationary brackets 51, and the rods carry compressible coil springs 52. When the valve-bottom 39 is shifted to the right to the end of its travel, the pecan within the bushing 44 will discharge therefrom, and at or before this time, the plungers 49 will have partly or wholly covered the inlet end of the bushing, preventing another pecan from entering the bushing, or engaging and holding the second pecan, which possibly may have partly entered the bushing. By this means only one pecan may be fed at a time, through the outlet or bushing 44.

Figure 3:
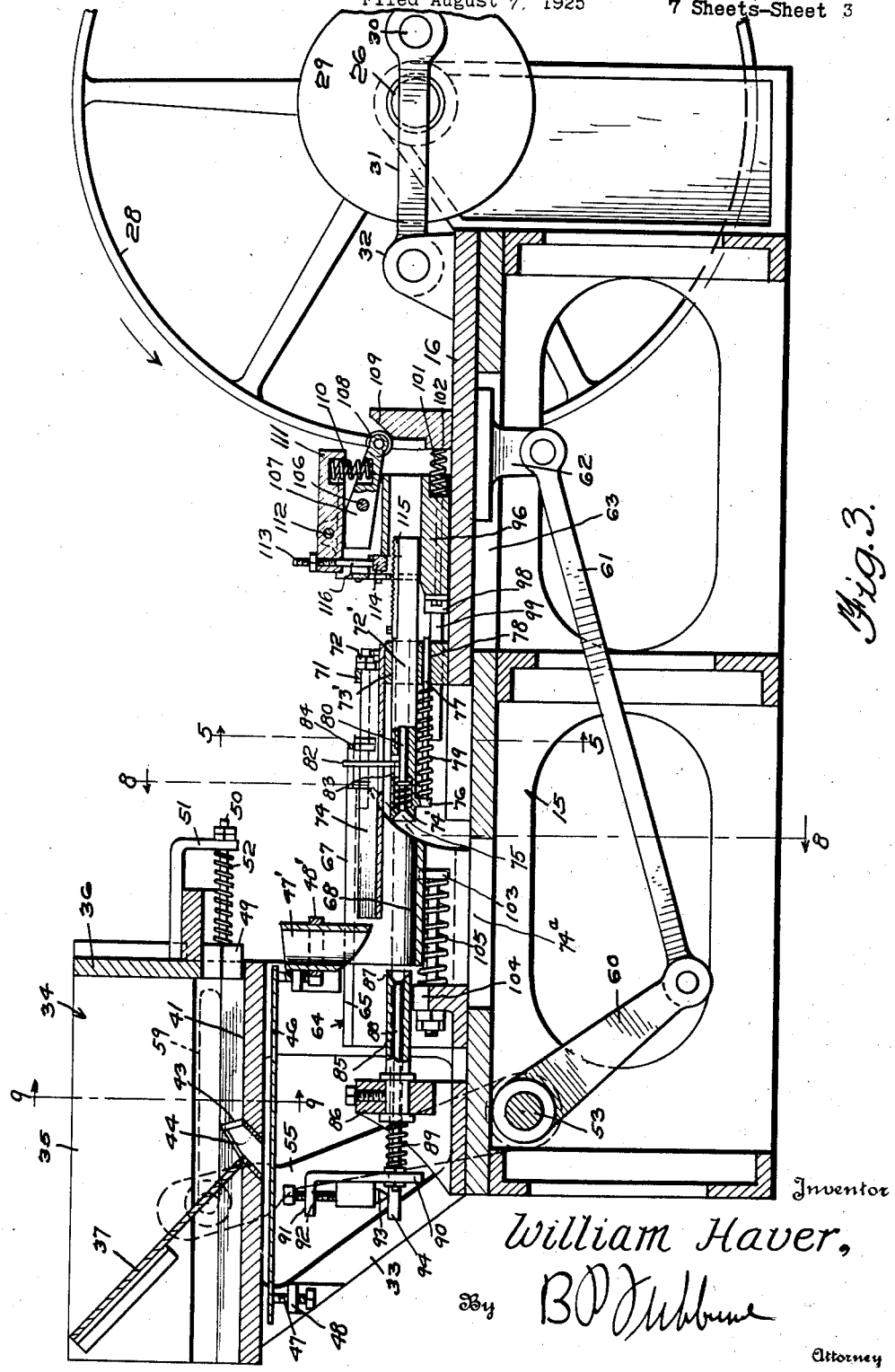
Figure 3 is a longitudinal section taken on line 3—3 of Figure 2.
Figure 8:
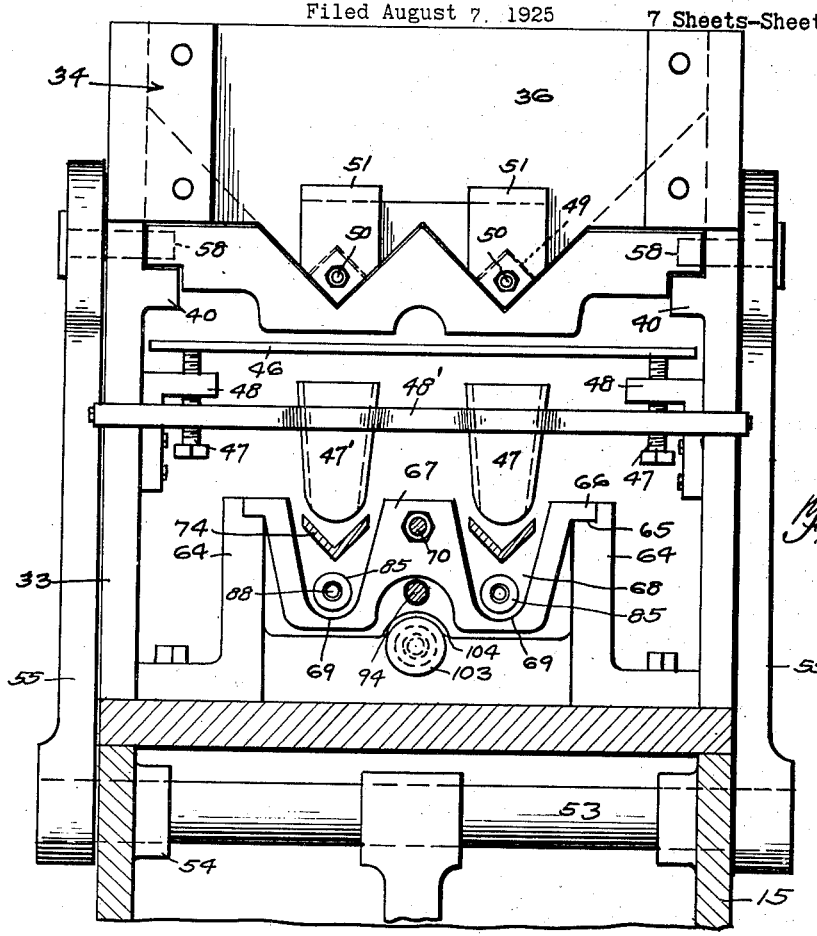
Figure 8 is a transverse section taken on line 8—8 of Figure 3.

Means are provided to reciprocate the valve-bottom 39, comprising a transverse horizontal rock shaft 53, journaled in bearings 54, see Figure 8. At its ends, this rock shaft has vertically swinging arms or levers 55, rigidly mounted thereon, and these levers are provided at their upper ends with elongated slots 56, receiving blocks 57, slidable longitudinally thereon, and these blocks carry pins 58, attached to the opposite edges of the valve-bottom 39, the pins 58 operating within longitudinal slots 59. The rock shaft is provided near its center with a depending arm 60, rigidly secured thereto, and this arm has pivotal connection with a link 61, which is pivoted to a bracket 62, Figure 3, fixed to the bottom of the carriage or cross head 16, and operating within a longitudinal opening 63.

Figure 1:
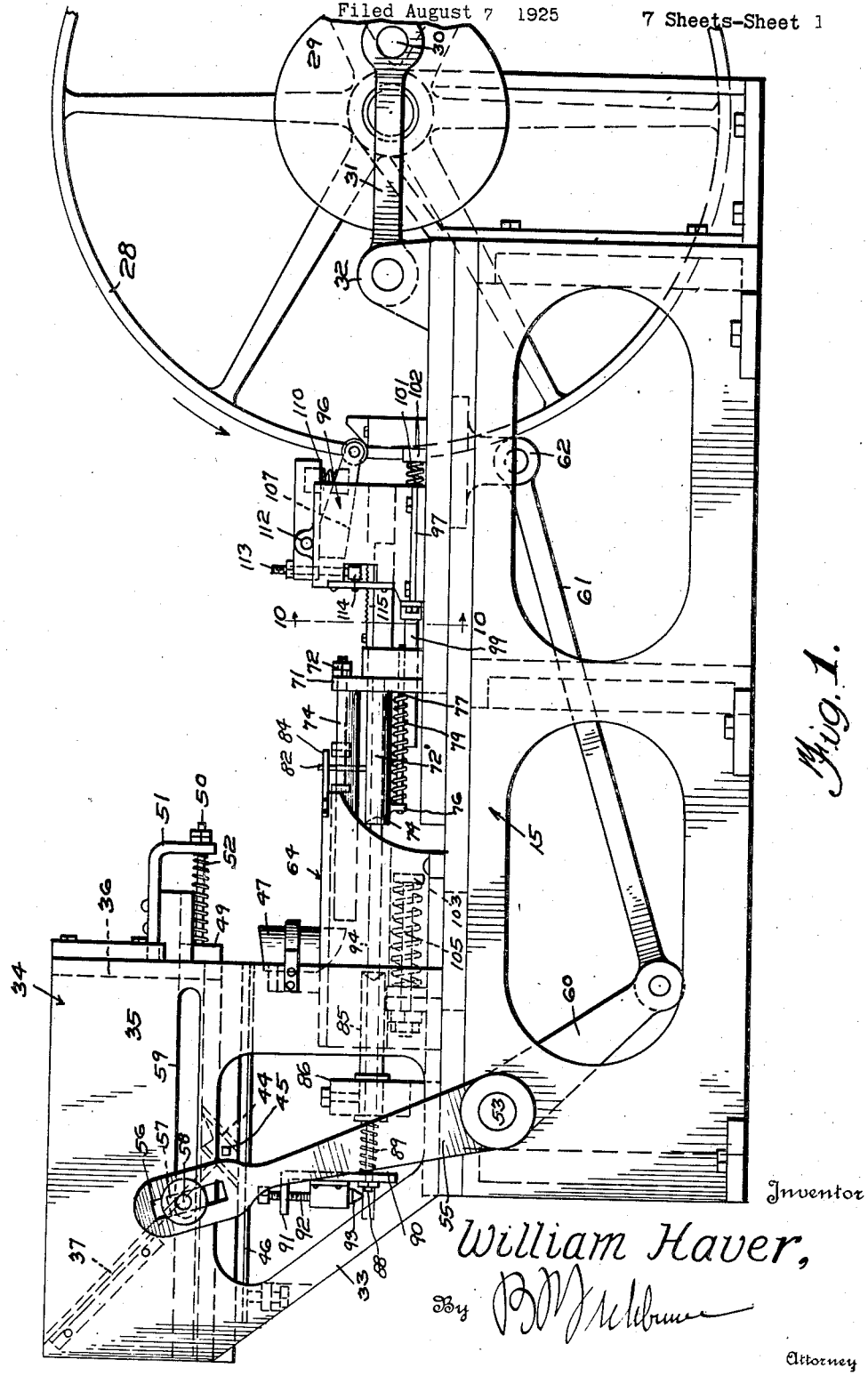
Figure 1 is a side elevation of a cracking machine embodying my invention.
Figure 2:
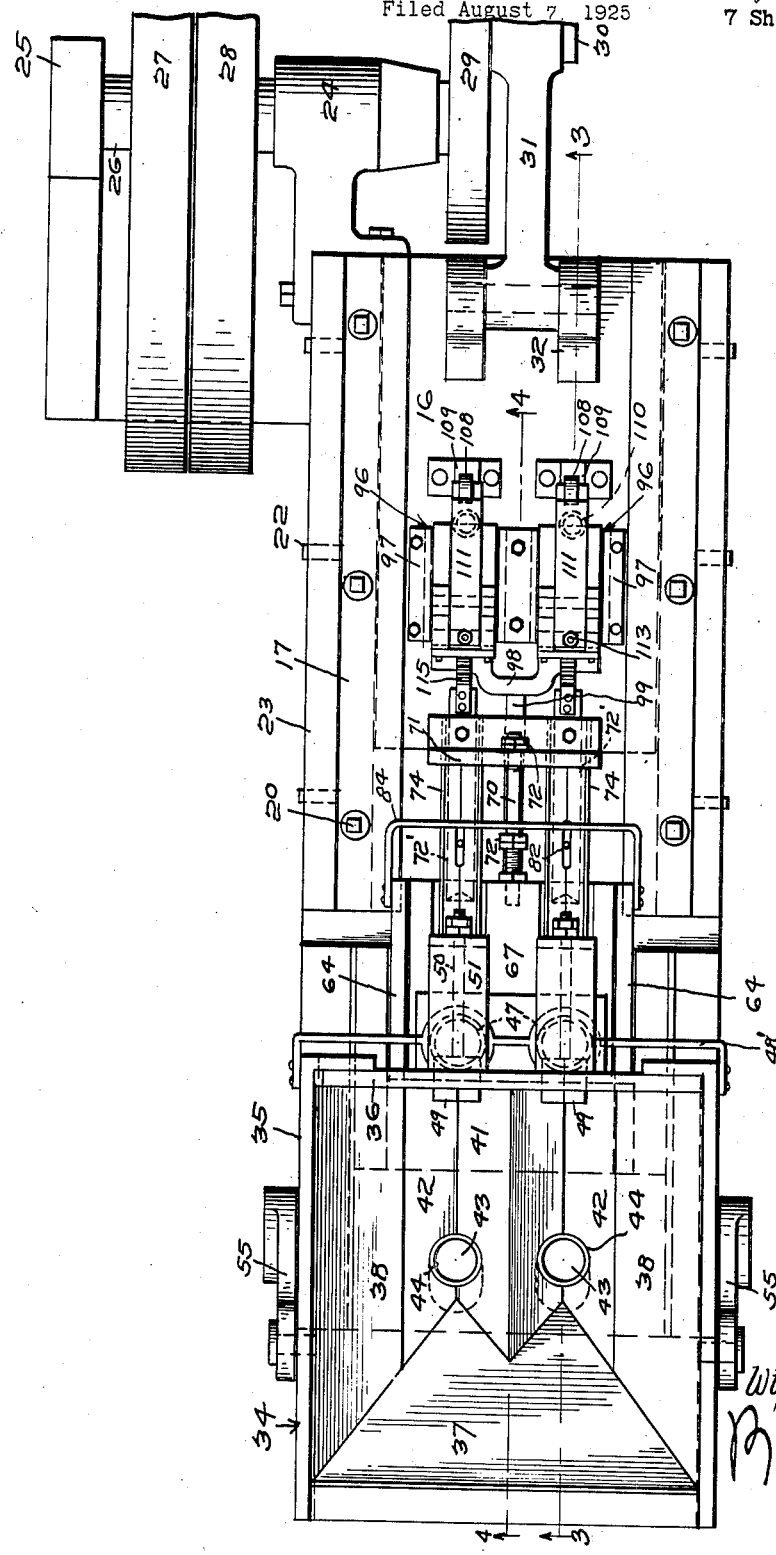
Figure 2 is a plan view of the same.

The numeral 64 designates stationary shuttle guides, having grooves 65, for receiving the flanges 66 of a shuttle 67. This shuttle, as clearly shown in Figure 8, is provided with longitudinal pockets or recesses 68, having rounded bottoms 69. The shuttle is moved by means of a longitudinal rod 70, Figure 2, and this rod is slidable through an opening in the top of a bridge or block 71, rigidly attached to the carriage 16. The rod 70 carries nuts 72 which are disposed upon the opposite sides of the block 71 and these nuts are of course adjustable. Operating in conjunction with the shuttle are horizontal feed troughs 74, V-shaped in cross section. These feed troughs extend longitudinally of the shuttle and project into the recesses or pockets 68 thereof, and are adapted to travel beneath the outlet ends of the vertical tubes 47'. These feed troughs are rigidly mounted upon the bridge or block 71, which is rigidly mounted upon the carriage 16. The feed troughs 74 are positioned in alinement with the tubes 47'.

Arranged beneath and in alinement with the feed troughs 74 are longitudinally movable cracking elements or rams, 72', slidable within openings 73', in the block 71. These rams are provided with cracking heads 74', having recesses 75, which receive the ends of the pecans. Depending from the heads 74' are lugs 76, having connection with rods 77, slidable in openings 78, formed in the block 71. Compressible coil springs 79 surround the rods 78. The heads 74' of the cracking rams are movable into the recesses or pockets 68 of the shuttle, beneath the feed troughs 74. Each cracking ram is tubular, for the reception of an ejector rod 80, adapted to move into the recess 75, and eject the pecan or shell remaining therein. This ejector rod is retained in the inner position by a spring 81, and carries a radial pin 82, rigidly attached thereto, and operating in a longitudinal slot 83. The pin 82 is arranged to engage a stationary part 84, when the cracking rams are shifted rearwardly or to the right, for a sufficient distance, whereby the ejector rods 80 will be automatically projected. Working in opposition to the cracking rams 72 are stationary elements or posts 85, held fixed within a stationary stand or bracket 86. The cracking posts are provided at their inner ends with recesses 87, to receive the ends of the pecans. It will be understood that a pecan is positioned within the bottom of the pocket 68, and one end of the pecan enters the recess 75 and the other end enters the recess 87, and when the ram 72' is moved sufficiently toward the post 85, the pecan is cracked by pressure applied to its opposite ends. The cracking posts 85 are tubular and receive sliding ejector rods 88, normally held in the rear position by springs 89. These ejector rods are connected by a yoke 90, whereby they move in unison, and this yoke is provided with a horizontal extension or ear 91, carrying an adjusting bolt 92, to regulate the tension of a spring catch device embodying a spring pressed bolt 93, which is attached to the element 90. This spring pressed bolt engages the upper surface of a latch rod 94, having a notch 95 therein, to receive the bolt 93. This latch rod extends forwardly, Figure 4, and is attached to the block or stand 71. It is thus seen that when the slide or carriage 16 is in the forward position, the bolt 93 may enter the notch 95, and when the carriage moves rearwardly, the ejector rods 87 will be projected, and the subsequent forward movement of the rod 94 will not produce binding action, as the bolt will trip out of the notch 95, and ride upon the upper surface of the latch rod.

The cracking mechanism further embodies a pair of cracking mechanism slides 96, mounted to travel longitudinally of the carriage 16, and operating within fixed guides or tracks 97. There are two of these slides and they are rigidly connected by a transverse yoke 98, to which is rigidly attached a longitudinal trip rod 99, slidable within an opening 100, in the stationary bridge or block 71. As more clearly shown in Figure 3, each slide 96 is normally held in the forward position upon the carriage 16 by a compressible coil spring 101, engaging therewith and with a stationary stop 102, rigidly mounted upon the carriage 16. Arranged in alinement with the longitudinal trip rod 99 is a stop bolt 103, slidable within a stationary ear 104. This stop bolt is retained in the projected position by a compressible coil spring 105, which is stronger than the combined strength of the two springs 101. It might be stated at this point that as the carriage 16 is moved forwardly to the left, the head 74' moves into proximity to the head 87, until the pecan is engaged. After this engagement, the forward movement of the cracking ram is arrested, and hence the extent of movement of the cracking ram, into engagement with the pecan, is regulated by the length of the pecan, whereby the cracking rams will always have the same and uniform engagement with the pecans prior to the application of the cracking force. The spring 79 associated with the cracking ram holds the head 74' in firm engagement with the pecan. Now the carriage 16 continues to travel forwardly to the left, the cracking ram 72' remaining stationary. The trip rod 99 will now engage the stop 103, with the result that the spring 101 is compressed, and the slide 96 shifted rearwardly upon the carriage 16, until it engages with the stop 102. Pivoted upon each slide 96, to swing in a vertical plane, as shown at 106 is a lever 107, carrying a roller 108 at its free end, to travel up the incline 109, of the stationary stop 102. The rear end of the lever is thus swung upwardly, for action against a compressible coil spring 110, engaging the rear end of a lever 111, which is pivoted upon the free end of the lever 107, as shown at 112. The lever 111 carries at its forward end an adjustable locking rod 113, having screw-threaded engagement therewith, and this locking rod carries a serrated head 114, arranged above a serrated plate 115, rigidly attached to the cracking ram 72'. The head 114 is preferably provided with a guide pin 116, and this head 114 is normally elevated by springs 116'. It is thus seen that by the time the locking mechanism slide has moved to the rearmost position in engagement with the stop 102, that the lever 107 will have been swung upwardly upon its pivot, and the serrated lock 114, brought into locking engagement with the serrated plate 115, whereby the cracking ram will be locked to the slide, with the result that the cracking ram, slide, and carriage 16 are then locked together and constitute a rigid unit, and upon the further continued forward movement of the carriage 16, the pecan held between the heads 74' and 87 will be cracked. When the carriage 16 completes its forward stroke and moves rearwardly, the parts of the cracking mechanism are released and restored to their normal condition.

The operation of the machine is as follows:

The hopper 34 is filled with the pecans which gravitate into the V-shaped pockets 41, one pecan ordinarily entering the bushing 44. The crank-disk 29 is rotating in the direction of the arrow, Figure 3. The valve-bottom 39 moves forwardly, and the pecan held within the bushing 44 slides along the support plate 46 and then discharges into the tube 47', and is supported within this tube by the support trough 74. The carriage 16 will now have completed its forward stroke, and upon the rear stroke of the carriage 16 the support trough 74 is carried rearwardly, and the shuttle 68 is also carried rearwardly, in proper timed order, so that when the support trough has moved from beneath the tube 47', Figure 3, the shuttle will be in the proper position to receive the pecan therein, which will extend longitudinally within the curved bottom 69 of the pocket 68. When the carriage 16 starts on its second forward stroke, the head 74' of the cracking ram is brought into engagement with one end of the pecan, within the shuttle, while the other end engages the head 87 of the stationary cracking post. The forward movement of the cracking ram is thus arrested, while the spring 79 retains it in firm engagement with the pecan. Further forward movement of the carriage 16 on the same stroke brings the tripping rod 99 in engagement with the trip 103, with the result that the slide 96 moves rearwardly in opposition to the spring 101, until the slide contacts with the stop 102, at which time the cracking ram, slide, and carriage 16 becomes rigidly locked as a unit for the remainder of the forward movement of the carriage, whereby the pecan is cracked. After the pecan is engaged and held by the cracking ram, and at about the time the cracking action occurs, the bridge 71 engages the rear nut 72, shifting the shuttle to the rear position, so that it is moved from beneath the pecan. When the ram moves rearwardly, the pecan is released, and falls through the opening 74ª, subsequently to which the shuttle again moves forwardly to the pecan holding position, upon the second rearward movement of the carriage.

It is to be understood that the form of my invention herewith shown and described is to be taken as a preferred example of the same, and that various changes in the shape, size, and arrangement of parts may be resorted to without departing from the spirit of my invention or the scope of the subjoined claims.

Having thus described my invention, I claim:—

1. In a machine for cracking pecans or the like, a support, a movable carriage thereon, cracking mechanism embodying a cracking element movable with relation to the carriage, yielding means to oppose the movement of the cracking element in one direction with relation to the carriage, a slide mounted upon the carriage, means to move the slide longitudinally in one direction with relation to the carriage, means to positively limit such longitudinal movement of the slide in one direction with relation to the carriage, and means to lock the cracking element with the slide upon such movement of the slide.

2. In a machine for cracking pecans or the like, a support, a movable carriage thereon, cracking mechanism embodying a cracking element movable with relation to the carriage, yielding means to oppose the movement of the cracking element in one direction with relation to the carriage, a slide mounted upon the carriage, a stop secured to the carriage in the path of travel of the slide, yielding means to oppose the movement of the slide toward the stop, trip means to shift the slide towards the stop, and means to lock the cracking element with the slide when the slide is shifted toward said stop.

3. In a machine for cracking pecans or the like, a support, a movable carriage thereon, cracking mechanism embodying a cracking element mounted upon the carriage and movable longitudinally in the direction of movement of the carriage, a slide movable upon the carriage, a stop mounted upon the carriage in the path of travel of the slide, yielding means to oppose the movement of the slide toward the stop, a cam supported by the carriage, a lever pivoted upon the slide and adapted to engage with the cam, and means operated by the lever to lock the cracking element with the slide.

4. In a machine of the character described, a support, a carriage mounted to travel thereon, a shuttle mounted upon the support, a lost motion connection between the shuttle and carriage, a feed trough rigidly mounted upon the carriage to travel therewith and deliver the pecan to the shuttle, a pecan feeding element arranged so that the feed trough moves beneath it, a cracking element connected with the carriage and adapted to enter one end of the shuttle, and an opposed cracking element arranged near the opposite end of the shuttle.

5. In a machine for cracking pecans or the like, a hopper, a sliding valve-bottom for the hopper provided with a longitudinal pocket and a transverse feed opening, a support plate held beneath the valve-bottom to support the pecan within the transverse feed opening, a spring pressed plunger slidably mounted within the pocket near the discharge end of the feed opening, delivery means receiving the pecan from the feed opening, and cracking mechanism receiving the pecan from the delivery means.

6. In a pecan cracking machine, a hopper, a reciprocating valve-bottom for the hopper having a pocket and a transverse feed opening, a support plate arranged beneath the valve-bottom, vertically adjustable means to hold the support plate at different elevations from the valve-bottom, and cracking mechanism receiving the pecan from the discharge opening.

7. In a machine for cracking pecans or the like, a support, a carriage mounted to reciprocate upon the support, a feeding element, a pecan support trough rigidly attached to the carriage and moved thereby beneath and from the feeding element, a shuttle moving beneath and from the feeding element, a lost motion connection between the shuttle and the carriage, and cracking mechanism operated by the carriage and adapted to engage the nut held within the shuttle.

8. In a machine for cracking pecans or the like, a support, a carriage mounted to reciprocate upon the support, a nut feeding element, a support trough attached to the carriage and movable therewith beneath and from the nut feeding element, a reciprocating shuttle separate from the support trough and receiving the support trough therein and arranged beneath the nut feeding element, a rod attached to the reciprocating shuttle and slidably engaging a part of the carriage and having spaced stops thereby providing a lost motion connection, and cracking mechanism actuated by the carriage and adapted to operate within the shuttle.

9. In a machine for cracking pecans or the like, a support, a carriage to reciprocate upon the support, a nut feeding element, a support trough attached to the carriage to reciprocate therewith for movement beneath and from the nut feeding element, a reciprocatory shuttle mounted for movement beneath the nut feeding element and separate from and movable with relation to the support trough, and means for moving the shuttle in a different timed order from the movement of the support trough, and cracking mechanism to operate within the shuttle and actuated by the movement of the carriage.

10. In a machine for cracking pecans or the like, a support, a carriage mounted to reciprocate upon the support, cracking mechanism embodying a longitudinally movable cracking element slidably mounted upon the carriage, yielding means to oppose the longitudinal movement of the cracking element in one direction, a slide mounted upon the carriage and movable longitudinally thereof with relation thereto, and means automatically actuated by the movement of the slide in one direction to lock the cracking element to the carriage.

11. In a machine for cracking pecans or the like, a support, a carriage mounted to slide upon the support, a reciprocating cracking element slidably mounted upon the carriage, yielding means to oppose the movement of the cracking element in one direction, automatic means to lock the cracking element to the carriage, a co-acting cracking element disposed opposite the first named cracking element, a support trough attached to the carriage, a nut feeding element disposed above the support trough, a shuttle arranged beneath the nut feeding element and separate from and movable independently of the support trough, and connecting means between the shuttle and the carriage.

12. In a machine for cracking pecans or the like, as a sub-combination, a carriage, a slide movable thereon, a stationary cam on the carriage, a slidable cracking element, and means mounted upon the slide and actuated by engagement with the cam to lock the cracking element to the slide.

13. In a machine for cracking pecans or the like, as a sub-combination, a carriage, a slide mounted upon the carriage, a stop and a cam stationary upon the carriage, a cracking element slidably mounted upon the carriage, and means connected with the slide and actuated by the cam to lock the cracking element to the slide, which in turn engages the stop.

14. In a machine for cracking pecans or the like, a hopper, a sliding valve-bottom for the hopper provided with a longitudinal pocket and a transverse feed opening, a support plate held beneath the valve-bottom to support the pecan within the transverse feed opening, a spring pressed plunger slidably mounted within the pocket near the discharge end of the feed opening, and cracking mechanism receiving the pecan from the feed opening.

15. In a machine for cracking pecans or the like, a hopper, a sliding valve-bottom for the hopper having a transverse feed opening, a support plate beneath the valve-bottom, a spring pressed plunger disposed near the discharge position of the transverse feed opening and adapted to cover such feed opening when it is shifted to the discharge position, and cracking mechanism receiving the pecan from the feed opening.

In testimony whereof I affix my signature.

WILLIAM HAVER.